(12) United States Patent
Kramb et al.

(10) Patent No.: US 12,378,392 B2
(45) Date of Patent: Aug. 5, 2025

(54) POLYOLEFIN COMPOSITIONS WITH HIGH DIMENSIONAL STABILITY FOR SHEET APPLICATIONS

(71) Applicant: Equistar Chemicals, LP, Houston, TX (US)

(72) Inventors: Ryan Kramb, Monroe, OH (US); Bryan S. Schley, Cincinnati, OH (US); Fabio Ceccarani, Youngstown, OH (US)

(73) Assignee: Equistar Chemicals, LP, Houston, TX (US)

( * ) Notice: Subject to any disclaimer, the term of this patent is extended or adjusted under 35 U.S.C. 154(b) by 114 days.

(21) Appl. No.: 17/749,660

(22) Filed: May 20, 2022

(65) Prior Publication Data

US 2022/0380584 A1  Dec. 1, 2022

Related U.S. Application Data

(60) Provisional application No. 63/194,713, filed on May 28, 2021.

(51) Int. Cl.
| | |
|---|---|
| C08L 23/14 | (2006.01) |
| C08L 23/08 | (2006.01) |
| C08L 23/0807 | (2025.01) |
| C08L 23/16 | (2006.01) |

(52) U.S. Cl.
CPC ............ C08L 23/08 (2013.01); C08L 23/14 (2013.01); C08L 23/142 (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 5,286,564 A | 2/1994 | Cecchin et al. | |
| 5,331,047 A * | 7/1994 | Giacobbe | C08L 23/10 525/88 |
| 6,172,172 B1 * | 1/2001 | Burgin | C08L 23/12 525/240 |
| 7,592,393 B2 | 9/2009 | Pelliconi et al. | |
| 8,008,400 B2 | 8/2011 | Pelliconi et al. | |
| 2009/0015678 A1 | 1/2009 | Hoogs et al. | |
| 2011/0272860 A1 * | 11/2011 | Walia | C08L 23/10 524/451 |
| 2012/0184675 A1 | 7/2012 | Pellegatti et al. | |

FOREIGN PATENT DOCUMENTS

| | | |
|---|---|---|
| EP | 472946 * | 4/1992 |
| EP | 0640648 A1 | 3/1995 |
| EP | 1025169 A1 | 8/2000 |
| EP | 1687372 A1 | 8/2006 |
| WO | 2011041533 A1 | 4/2011 |
| WO | 2016207235 A1 | 12/2016 |
| WO | 2016207236 A1 | 12/2016 |

OTHER PUBLICATIONS

MICOM; Standard Test Method for Tensile Properties of Plastics; pp. 1-5 (no date). (Year: 0000).*
International Search Report and Written Opinion Mailed Aug. 12, 2022 (Aug. 12, 2022) for Corresponding PCT/US2022/030295.

* cited by examiner

*Primary Examiner* — David J Buttner (57) ABSTRACT

A polyolefin composition useful for making sheet membranes, as well as other articles of manufacture are described. The composition polyolefin combines a reactor made thermoplastic (rTPO) with at least one linear low-density polyethylene (LLDPE) to improve the mold shrinkage and thermal expansion force compared to a rTPO-only composition, without affecting other properties.

15 Claims, 4 Drawing Sheets

POLYOLEFIN COMPOSITIONS WITH HIGH DIMENSIONAL STABILITY FOR SHEET APPLICATIONS

CROSS-REFERENCE TO RELATED APPLICATIONS

This application is the Non-Provisional Patent Application, which claims benefit of priority to U.S. Provisional Application No. 63/194,713, filed May 28, 2021, the contents of which are incorporated herein by reference in their entirety.

FIELD OF THE DISCLOSURE

The disclosure relates to polyolefin compositions, specifically to polyolefin-based sheet membranes for building and construction applications.

BACKGROUND OF THE DISCLOSURE

Polyolefins have been frequently used in commercial plastics applications because of their outstanding performance and cost characteristics. These polymers can be either amorphous or highly crystalline, and they are able to behave as thermoplastics, thermoplastic elastomers, or thermosets. As such, polyolefins are easily designed and modified for select applications by properly selecting their molecular structure and molecular weight distribution(s) to obtain a suitable balance of tensile strength, tear resistance, stiffness, impact resistance and processability in the extrusion processes.

One area of increased interest in polyolefins is the formation of sheet membranes. Polyolefin sheet membranes have become a very important part of the building and construction industry due to their beneficial characteristics, including mechanical toughness, flexibility, barrier properties, and environmental resistance.

Single-ply roofing membranes, in particular, is one of the fastest growing areas for industrial sheet membranes. The growth has largely been attributed to a rise in commercial building construction activities all over the world, propelled by rising population, rapid urbanization, and strong economic growth. However, the versatility of roofing membranes also contributes to growth as they can be applied to roofs of all shapes and sizes, including exposed roofs, green roofs, cool roofs, ballasted roofs and more, from large scale commercial projects such as airports and factories to private house rooftops.

In addition to roofing and other building applications, waterproof sheet membranes are increasingly being used for water and wastewater management systems, as well as solid waste management on account of their flexibility, ease of application, ability to control or eliminate seepage, and cost-effectiveness.

Growing demand for residential and commercial spaces coupled with increasing investments in the development of water conservation and wastewater treatment infrastructure is expected to positively impact the growth of roofing membranes, geomembranes, and waterproofing sheet membranes in general.

With the advanced developments of polymerization techniques, polyolefins have been rapidly expanding in sheet membrane applications through various chemical and physical forms, including cross-linked polyolefins, co-polymers, high melt strength (branched) polyolefins, and polyolefin blends. However, despite the advances made in polyolefin sheet membranes, there is a continued need for the development of improved compositions having increased dimensional stability without sacrificing flexibility, waterproofing, environment resistance, and ease of processing.

SUMMARY OF THE DISCLOSURE

The present disclosure provides polyolefin compositions that have high dimensional stability, high flexibility, high tear and puncture resistance, and ease of processing. Specifically, the novel polyolefin compositions comprise a propylene-based reactor made thermoplastic polyolefin (rTPO) and a linear low-density polyethylene (LLDPE), as well as additives and optional fillers. The addition of the LLDPE improves the dimensional stability without sacrificing the high flexibility, low hardness, and ease of processing of the rTPO. This allows the polyolefin compositions to be used in a variety of sheet membrane applications, including as roofing membranes, geomembranes, automotive skins, automotive and residential flooring, and others, and is especially useful in applications requiring minimal dimensional changes.

In particular, the novel polyolefin compositions described herein have a polymer composition that combines a rTPO with greater than 0 to about 30 wt. % of LLDPE. The addition of the LLDPE improves the dimensional stability compared to using only a rTPO in the polymer composition, and the novel polyolefin compositions have about the same or better flexibility, tear and puncture resistance, and ease of processing compared to compositions using only a rTPO. The novel polyolefin compositions further comprise additives and optional fillers specific to the final application of articles formed from the polyolefin compositions.

In some embodiments, the articles formed from the novel polyolefin compositions have a mold shrinkage reduction of up to 30% compared to a composition without the LLDPE, and a reduction in the max thermal expansion force, or growth force, of up to 40% compared to a polyolefin composition without the LLDPE. In some embodiments, the articles formed from the novel compositions have having a mold shrinkage of about 0.5 to about 0.7%, and a maximum thermal expansion force between 2.0 and 3.4 N.

The present disclosure includes any of the following embodiments in any combination(s) of one or more thereof:

A polyolefin composition comprising (a) a polymer composition with (i) greater than 0 and about 30 wt. %, based on the total weight of the polymer composition, of a linear low-density polyethylene (LLDPE) and (ii) about 70 wt. % to less than 100 wt. %, based on the total weight of the polymer composition, of a reactor-made thermoplastic polymer (rTPO); (b) an additives package; and (c) an optional fillers package.

A polyolefin composition comprising (a) a polymer composition with (i) a linear low-density polyethylene (LLDPE) comprising copolymers of ethylene with at least one alpha-olefin selected from the group consisting of 1-butene, 1-hexene, and 1-octene, wherein the LLDPE is present in an amount between greater than 0 and about 30 wt. %, based on the total weight of the polymer composition; (ii) a reactor-made thermoplastic polymer (rTPO) present in an amount between about 70 wt. % to less than 100 wt. %, based on the total weight of the polymer composition, the rTPO comprising: (A) 10-70 parts by weight of a homopolymer of propylene with isotactic index greater than 80, or a copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80; (B) 5-20 parts by weight of a copolymer fraction of ethylene and propylene or another $CH_2$=CHR alpha-olefin, where R is a 2-8 carbon alkyl radical, or combinations thereof, greater than about 35% by weight ethylene, insoluble in xylene at ambient temperature, (C) 40-80 parts by weight of a copolymer fraction of ethylene and propylene or another $CH_2$=CHR alpha-olefin, where R is a 2-8 carbon alkyl radical, or combinations thereof, and optionally, minor portions of a diene, the fraction containing from 20 to less than 60% by weight of ethylene, being soluble in xylene at ambient temperature, and having an intrinsic viscosity of the xylene soluble fraction from 1.5 to 4 dl/g, wherein the percent by weight of the sum of the (B) and (C) fractions with respect to the total reactor-made thermoplastic polymer being from 30% to 90% and the (B)/(C) weight ratio being lower than 0.4; and (b) an additives package comprising one or more additives. The melt flow rate (ASTM D 1238L) of the polyolefin composition is between about 0.1 and 10 g/10 min.

Any of the polyolefin compositions described herein, wherein the reactor-made thermoplastic polymer comprises (A) 10-70 parts by weight of a homopolymer of propylene with isotactic index greater than 80, or a copolymer of propylene with ethylene, a $CH_2$=CHR alpha-olefin where R is a 2-8 carbon alkyl radical or combinations thereof, which copolymer contains over 85% by weight of propylene and having an isotactic index greater than 80; (B) 5-20 parts by weight of a copolymer fraction of ethylene and propylene or another $CH_2$=CHR alpha-olefin, where R is a 2-8 carbon alkyl radical, or combinations thereof, greater than about 51% by weight ethylene, insoluble in xylene at ambient temperature, (C) 40-80 parts by weight of a copolymer fraction of ethylene and propylene or another $CH_2$=CHR alpha-olefin, where R is a 2-8 carbon alkyl radical, or combinations thereof, and optionally, minor portions of a diene, the fraction containing from 20 to less than 60% by weight of ethylene, being soluble in xylene at ambient temperature, and having an intrinsic viscosity of the xylene soluble fraction from 1.5 to 4 dl/g, wherein the percent by weight of the sum of the (B) and (C) fractions with respect to the total reactor-made thermoplastic polymer being from 30% to 90% and the (B)/(C) weight ratio being lower than 0.4.

Any of the polyolefin compositions described herein, wherein the reactor-made thermoplastic polymer comprises (A) 20-40 parts by weight of a random copolymer of propylene with ethylene, a $CH_2$=CHR alpha-olefin where R is a 2-8 carbon alkyl radical or combinations thereof, which copolymer contains over 85% by weight of propylene and having an isotactic index greater than 80; (B) 5-10 parts by weight of a copolymer fraction of ethylene and propylene or another $CH_2$=CHR alpha-olefin, where R is a 2-8 carbon alkyl radical, or combinations thereof, greater than about 35% by weight ethylene, insoluble in xylene at ambient temperature, (C) 55-75 parts by weight of a copolymer fraction of ethylene and propylene or another $CH_2$=CHR alpha-olefin, where R is a 2-8 carbon alkyl radical, or combinations thereof, and optionally, minor portions of a diene, the fraction containing from 20 to less than 40% by weight of ethylene, being soluble in xylene at ambient temperature, and having an intrinsic viscosity of the xylene soluble fraction from 1.5 to 4 dl/g, wherein the percent by weight of the sum of the (B) and (C) fractions with respect to the total reactor-made thermoplastic polymer being from 50% to 90% and the (B)/(C) weight ratio being lower than 0.4; wherein the reactor-made thermoplastic polymer has a flexural modulus of less than 150 MPa, a tensile stress at break of from 8 to 20 MPa, an elongation at break of higher than 400%, a tension set at 75% of from 20% to 50% and a haze of less than 40%.

Any of the polyolefin compositions described herein, wherein the reactor-made thermoplastic polymer has: (A) 30-60 parts by weight of a homopolymer of propylene with isotactic index greater than 80, or a copolymer of propylene with ethylene, a $CH_2$=CHR alpha-olefin where R is a 2-8 carbon alkyl radical or combinations thereof, which copolymer contains over 85% by weight of propylene and having an isotactic index greater than 80; (B) 5-10 parts by weight of a copolymer fraction of ethylene and propylene or another $CH_2$=CHR alpha-olefin, where R is a 2-8 carbon alkyl radical, or combinations thereof, greater than about 35% by weight ethylene, insoluble in xylene at ambient temperature, (C) 55-75 parts by weight of a copolymer fraction of ethylene and propylene or another $CH_2$=CHR alpha-olefin, where R is a 2-8 carbon alkyl radical, or combinations thereof, and optionally, minor portions of a diene, the fraction containing from 20 to less than 40% by weight of ethylene, being soluble in xylene at ambient temperature, and having an intrinsic viscosity of the xylene soluble fraction from 1.5 to 4 dl/g, wherein the percent by weight of the sum of the (B) and (C) fractions with respect to the total reactor-made thermoplastic polymer being from 40% to 70% and wherein the percent by weight of the sum of the ethylene in (B) and (C) fractions with respect to the total reactor-made thermoplastic polymer being from 20% to 50%.

Any of the polyolefin compositions described herein, wherein the reactor-made thermoplastic polymer has: (A) from 8 to 25% by weight of a crystalline polymer fraction selected from the group consisting of: (i) a propylene homopolymer, having solubility in xylene at ambient temperature lower than 10% by weight; and (ii) a copolymer of propylene and at least one alpha-olefin of formula $CH_2$=$CH_R$, where R is H or a 2-6 carbon linear or branched alkyl, containing at least 85% by weight of propylene, having solubility in xylene at ambient temperature lower than 15% by weight; and (B) from 75 to 92% by weight of an elastomeric fraction comprising: (1) a first elastomeric copolymer of propylene with at least one alpha-olefin of formula $CH_2$=$CH_R$, where R is H or a 2-6 carbon linear or branched alkyl, optionally containing 0.5 to 5% by weight of a diene, wherein the first elastomeric copolymer contains from 15 to 32% by weight alpha-olefin, and has a solubility in xylene at ambient temperature of greater than 50% by weight, the intrinsic viscosity of the xylene soluble fraction ranging from 3.0 to 5.0 dl/g; and (2) a second elastomeric copolymer of propylene with at least one alpha-olefin of formula $CH_2$=$CH_R$, where R is H or a 2-6 carbon linear or branched alkyl, optionally containing 0.5 to 5% by weight of a diene, wherein the second elastomeric copolymer contains more than 32% up to 45% by weight alpha-olefin, and has a solubility in xylene at ambient temperature greater than 80% by weight, the intrinsic viscosity of the xylene soluble fraction ranging from 4.0 to 6.5 dl/g; wherein a (1)/(2) weight ratio ranges from 1:5 to 5:1. The rTPO also has a flexural modulus lower than 60 MPa, a Shore A hardness lower than 90, and a tension set at 100% lower than 35%.

Any of the polyolefin compositions described herein, wherein the linear low-density polyethylene (LLDPE) comprises copolymers of ethylene with at least one alpha-olefin selected from the group consisting of 1-butene, 1-hexene, and 1-octene.

Any of the polyolefin compositions described herein, wherein the LLDPE is an extrusion grade.

Any of the polyolefin compositions described herein, wherein the LLDPE is present in an amount between about 5 and about 25 wt. %, based on the total weight of the polymer composition.

Any of the polyolefin compositions described herein, further comprising an additives package having one or more different additives.

Any of the polyolefin compositions described herein, further comprising a fillers package having two or more different fillers.

Any of the polyolefin compositions described herein, having up to 80 wt. % of a fillers package and less than 20 wt. % of a additives package, wherein the balance of the composition is the polymer composition.

An article prepared from any of the polyolefin compositions described herein.

An article molded or extruded from any of the polyolefin compositions described herein.

Any of the articles described herein, where the article has a mold shrinkage of about 0.5 to about 0.7% (measured per ASTM D955) and a thermal expansion force between 2 and 3.4 N.

A sheet membrane prepared from any of the polyolefin compositions described herein.

A sheet membrane comprising (a) a polymer composition with (i) a linear low-density polyethylene (LLDPE) comprising copolymers of ethylene with at least one alpha-olefin selected from the group consisting of 1-butene, 1-hexene, and 1-octene, wherein the LLDPE is present in an amount between greater than 0 and about 30 wt. %, based on the total weight of the polymer composition; (ii) a reactor-made thermoplastic polymer (rTPO) present in an amount between about 70 wt. % to less than 100 wt. %, based on the total weight of the polymer composition, the rTPO comprising: (A) 10-70 parts by weight of a homopolymer of propylene with isotactic index greater than 80, or a copolymer of propylene with ethylene, a $CH_2$=CHR alpha-olefin where R is a 2-8 carbon alkyl radical or combinations thereof, which copolymer contains over 85% by weight of propylene and having an isotactic index greater than 80; (B) 5-20 parts by weight of a copolymer fraction of ethylene and propylene or another $CH_2$=CHR alpha-olefin, where R is a 2-8 carbon alkyl radical, or combinations thereof, greater than about 35% by weight ethylene, insoluble in xylene at ambient temperature, (C) 40-80 parts by weight of a copolymer fraction of ethylene and propylene or another $CH_2$=CHR alpha-olefin, where R is a 2-8 carbon alkyl radical, or combinations thereof, and optionally, minor portions of a diene, the fraction containing from 20 to less than 60% by weight of ethylene, being soluble in xylene at ambient temperature, and having an intrinsic viscosity of the xylene soluble fraction from 1.5 to 4 dl/g, wherein the percent by weight of the sum of the (B) and (C) fractions with respect to the total reactor-made thermoplastic polymer being from 30% to 90% and the (B)/(C) weight ratio being lower than 0.4; (b) an additives package comprising one or more additives; and (c) a fillers package comprising two or more fillers. The sheet membrane has a mold shrinkage of about 0.5 to about 0.7% as measured per ASTM D955 and a max force of thermal expansion between 2 and 3.4 N.

Any of the sheet membranes described herein, wherein the sheet membrane is a geomembrane, automotive skin, roofing membrane or flooring membrane.

Any of the sheet membranes described herein, where the sheet membrane has a maximum thermal expansion force of about 2 N.

Any of the sheet membranes described herein, where the sheet membrane has a mold shrinkage of the sheet membrane is about 0.7%

This summary is provided to introduce a selection of concepts that are further described below in the detailed description. This summary is not intended to identify key or essential features of the claimed subject matter, nor is it intended to be used as an aid in limiting the scope of the claimed subject matter.

DEFINITIONS

As used herein, the term "sheet membrane" refers to films or sheets useful in a variety of applications such as roof sheeting, geomembranes, pond liners, and other durable applications requiring long term exposure to a variety of environmental conditions, sometimes extreme, with minimal dimensional changes. These films are typically much thicker, possess less elasticity, and require greater long-term resistance to severe environmental conditions resulting from roof movement, heavy winds, freeze-thaw cycles, and high temperatures than their lighter duty, disposable counterparts such as those films used in food and medical applications.

The term "monomer" means any compound with a polymerizable moiety. In those instances, in which a polymer is described as comprising one or more monomers, e.g., a polymer comprising propylene and ethylene, the polymer comprises repeat units derived from the monomers, e.g., —$CH_2$—$CH_2$—, and not the monomer itself, e.g., $CH_2$=$CH_2$.

As used herein the term "polymer" means a macromolecular compound prepared by polymerizing monomers of the same or different type. The term "polymer" includes homopolymers, copolymers (including block and random), terpolymers, interpolymers, and so on.

As used herein, the term "polyolefin" includes polymers such as polyethylene, polypropylene, polybutene, and copolymers thereof with a lesser amount of a comonomer such as vinyl acetate, and other polymeric resins within the "olefin" family classification.

The terms "Reactor made thermoplastic polyolefins" or "reactor thermoplastic polyolefins" or "rTPO" are used interchangeably to refer to thermoplastic polyolefins that are made in a reactor.

As used herein, the term "polyolefin composition" refers to a composition made from and/or containing at least one polyolefin.

As used herein, the term "α-olefin" or "alpha-olefin" means an olefin of the general formula $CH_2$=CH—R, wherein R is a linear or branched alkyl containing from 1 to 10 carbon atoms. The alpha-olefin can be selected, for example, from propylene, 1-butene, 1-pentene, 1-hexene, 1-octene, 1-dodecene, and the like.

As used herein, the term "heterophasic copolymer" or "heco" refers to a reactor blend of homopolymers and/or copolymers that contains two components: A) a semi-crystalline polypropylene matrix and B) a partially amorphous bipolymer component. The polypropylene matrix may be a homopolymer (HOMO) PP or a random copolymer (RACO) PP of propylene with ethylene or other alpha-olefins. The bipolymer is typically dispersed within the semi-crystalline polypropylene matrix.

As used herein, the term "homopolymer" or "HOMO" refers to a polymer consisting solely or essentially of units derived from a single kind of monomer, e.g., polyethylene homopolymer is a polymer comprised solely or essentially of units derived from ethylene, and polypropylene homopolymer is a polymer comprised solely or essentially of units derived from propylene.

As used herein, the term "copolymer" refers to a polyolefin polymer that contains two types of alpha-olefin monomer units.

A "bipolymer" is a specific type of copolymer that has elastomeric properties and a sufficient co-monomer content to create a partially amorphous phase, about >10% comonomer. A bipolymer is one component of the final polymer composition of a PP heterophasic copolymer or a rTPO.

The term "intrinsic viscosity" refers to the measure of a solute's contribution to the viscosity of a solution.

As used herein, the term "room temperature" refers to a temperature around 23 degrees Celsius (unless it is defined differently in an ASTM, in which case "room temperature" means as it is defined within that ASTM for that particular test/procedure/method). "Ambient temperature" is approximately 25° C.

All concentrations herein are by weight percent ("wt. %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CLTE | Coefficient of Linear Thermal Expansion |
| HECO | Heterophasic copolymer |
| HOMO | Homopolymer |
| LLDPE | Linear low-density polyethylene |
| MFR | Melt flow rate |
| PE | Polyethylene |
| PP | Polypropylene |
| RACO | Random copolymer |

-continued

| ABBREVIATION | TERM |
| --- | --- |
| rTPO | Reactor made thermoplastic polyolefin |
| TPO | Thermoplastic polyolefin |
| wt. % | Weight percent |

Test Methods

The components of the polyolefin compositions disclosed herein, the polyolefin compositions themselves, and the resulting articles formed therefrom were tested and analyzed using one or more of the following test methods:

The terms "melt flow rate" and "MFR" are used interchangeably to refer to the measure of the ability of the melt of the base resin to flow under pressure. The melt flow rate was be determined by ASTM D 1238L (entitled "Standard Test Method for Melt Flow Rates of Thermoplastics by Extrusion Plastometer"), which measures the melt flow rate at 230° C. and 2.16 Kg of weight, and is given in gram/10 min. The term "ASTM D 1238L" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Aug. 1, 2013 and published in August 2013, the contents of which are incorporated herein by reference in its entirety. The "melt flow range" is a range of melt flow rates.

Density is given in $g/cm^3$ and measured using ASTM D792-19 (entitled "Standard Test Methods for Density and Specific Gravity (Relative Density) of Plastics by Displacement"). The term "ASTM D792" as used herein refers to the test method published in 2019, the content of which is incorporated herein by reference in its entirety.

The as-molded shrinkage measures the difference between a room temperature mold part to a room temperature mold (RT Mold Part/RT Mold) and is given in inch per linear inch (in/in), thousands of an inch (mils) per linear inch (mils/in), or as a percentage (%). The standard testing method for shrinkage is ASTM D955-08 (entitled "Standard Test Method of Measuring Shrinkage from Mold Dimensions of Thermoplastics"). The term "ASTM D955" as used herein refers to the test method published in 2014, the content of which is incorporated herein by reference in its entirety.

Some sheet membranes have a tendency to grow, especially in hot, humid environments. This is a problem as many membranes are installed edge-to-edge with no room for expansion. The growth tendency can be measured by Coefficient of Linear Thermal Expansion (CLTE) and the force of thermal expansion ("Thermal Expansion Force"). For soft materials such as sheet membranes, CLTE measurements have a higher variability because the instrumentation used for the test methods can distort the growth. As such, Thermal Expansion Force was used to characterize the dimensional stability of the presently claimed materials.

Thermal Expansion Force is a measure of growth or expansion forces exerted by a sample as the material is heated. The Thermal Expansion Force Method used herein was developed in-house and utilizes a rotational rheometer such as the ARES-G2 (TA Instruments). Samples were prepared by compression molding at 190° C. under 3000 psi (~20.7 mPa) for 2 minutes, and then cutting, by a die, a sample that was 20 mm long and about 12.7 mm wide. The samples are loaded into the clamps on the rotational rheometer, which was placed in a temperature-controlled chamber that was heated from 27 to about 85° C. at 2° C./min increments, while the sample clamps were torqued to 20 cN-m. The tests were stopped once a maximum in the force measurement was reached, not at a particular temperature. The maximum in the force for a rTPO occurs between 40° C. and 50° C., and the maximum in the force for a LLDPE occurs between 60° C. and 70° C. Thus, the compositions in the present disclosure have a maximum in the force between 40° C. and 70° C.

The intrinsic viscosity of the xylene soluble fraction, also referred to as the "xylene soluble intrinsic viscosity", was determined using decalin or tetrahydronaphthalene at 135° C., in accordance with ISO 1628-1 (entitled "Plastics—Determination of the viscosity of polymers in dilute solution using capillary viscometers").

The isotactic index of the polymer used herein was considered to be the percent by weight of polymer insoluble in xylene at room temperature. This value corresponded substantially to the isotactic index determined by extraction with boiling n-heptane, which by definition constitutes the isotactic index of polypropylene.

The Shore Hardness A and D was determined using ASTM D2240 (entitled "Standard Test Method for Rubber Property—Durometer Hardness").

Tensile Strength and Tensile Modulus, measured on 40 mil (1 mm) thick sheet samples, are given in pounds per square inch (psi) and measured using ASTM D638-03 (entitled "Standard Test Method for Tensile Properties of Plastics"). The term "ASTM D638" as used herein refers to the test method published in 2003, the content of which is incorporated herein by reference in its entirety. Tensile strength measured on injection molded specimens are given in megapascals (MPa) and measured using ISO 527-1 2019 (entitled "Plastics—Determination of tensile properties"), the content of which is incorporated herein by reference in its entirety.

Tear Resistance, measured on 40 mil sheet samples, is given in newton (N) and measured using ASTM D1004 (entitled "Standard Test Method for Tear Resistance (Graves Tear) of Plastic Film and Sheeting"), the content of which is incorporated herein by reference in its entirety. Tear Strength measured on injection molded plaques is given in kN/m and measured using a modified version of ASTM D624 (entitled "Standard Test Method for Tear Strength of Conventional Vulcanized Rubber and Thermoplastic Elastomers"), the content of which is incorporated herein by reference in its entirety. The modification to this method was a lower speed of about 2 in./min.

Puncture Resistance measured on 40 mil sheet samples is given in newton (N) and measured using ASTM D4833 (entitled "Standard Test Method for Index Puncture Resistance of Geomembranes and Related Products"), the content of which is incorporated herein by reference in its entirety.

While many of the above-described test methods have specific molding requirements for sample specimens, it should be noted that the compositions described herein can be extruded or molded using any means known in the art as required for its intended application.

For the above-referenced ASTM standards, visit the ASTM website, www.astm.org, or contact ASTM Customer Service at service@astm.org. Similarly, for the above-referenced ISO standards, visit the ISO website, www.iso.org.

DESCRIPTION OF EMBODIMENTS OF THE DISCLOSURE

The present disclosure is directed to novel polyolefin compositions for use in membrane applications, particularly as sheet membranes. In particular, the novel polyolefin compositions have a polymer composition that combines a propylene-based reactor made thermoplastic polyolefin (rTPO) with greater than 0 and up to about 30 wt. %, based on the total weight of the polymer composition, of a linear low-density polyethylene (LLDPE). The novel polyolefin compositions also have an additives package including, but not limited to, colorants, processing aids, antioxidants, ultraviolet light stabilizers, and flame retardants, and can have an optional fillers package, depending on the final application of articles and membranes formed from the polyolefin compositions.

Propylene-based compounded thermoplastic polyolefins have been used in sheet membranes applications due to their durability, flexibility, barrier properties, and thermal resistance. The rTPOs, however, have improved properties over compounded TPOs, and lower costs associated with eliminating the compounding step. The reactor polymerization process also allows for better impact/stiffness balance, thermal resistance, cold temperature impact, creep resistance, wide range of flexural modulus, extreme toughness, high heat resistance, exceptional puncture resistance, and controlled shrinkage when compared to the compounded TPOs. All of these improved properties make rTPOs excellent candidates for sheet membrane applications.

However, it was found that even further improvements in the dimensional stability of the sheet membranes could be obtained by adding a LLDPE to the rTPO without affecting other properties such as tensile strength, tear strength, puncture resistance, flexural modulus, and tensile modulus. In particular, the addition of LLDPE results in articles having a mold shrinkage that is about 0.5 to 0.7% and a thermal expansion force that is about 2 to 3.4 N. In some embodiments, the addition of LLDPE results in articles having a mold shrinkage that is up to 30% lower than a polyolefin composition without the LLDPE and a max thermal expansion force, or growth force, that is up to 40% lower than a polyolefin composition without the LLDPE. The flexibility, low hardness, and ease of processing properties of the rTPO are retained in the novel polyolefin compositions.

The details of the novel polyolefin compositions and physical properties of both the compositions and articles formed therefrom are described below.

I. Composition

The presently disclosed polyolefin compositions combine a polymer composition with an additives package and, optionally, a fillers package. In particular, the presently disclosed compositions have: (a) less than 100 wt. % of the total polyolefin composition is a polymer composition having a rTPO and an LLDPE; (b) less than 20 wt. % of the total polyolefin composition is an additives package; and, (c) optional a filler package, wherein the optional filler can be up to 80 wt. % of the total polyolefin composition.

Polymer composition. The polymer composition combines a rTPO with at least one LLDPE. The rTPO is present in an amount that is between about 70 wt. % and less than 100 wt. %, based on the total weight of the polymer composition. The balance of the polymer composition is LLDPE(s).

In some embodiments, the rTPO is present in an amount between about 72 wt. % and about 90 wt. %, based on the total weight of the polymer composition; alternatively, the rTPO is present in an amount between about 85 wt. % and about 99 wt. %, based on the total weight of the polymer composition; alternatively, the rTPO is present in an amount between about 85 wt. % and about 95 wt. %, based on the total weight of the polymer composition; alternatively, the rTPO is present in an amount of about 80 wt. % or about 90 wt. %, based on the total weight of the polymer composition.

In some embodiments, the rTPO is a heterophasic copolymer, wherein a propylene homopolymer or a random copolymer (RACO) with ethylene is combined with a bipolymer. In other embodiments, the rTPO is propylene-based. Propylene-based rTPOs may have three components: A) a semi-crystalline propylene homopolymer, or random copolymer with ethylene or other alpha-olefins; B) a polyethylene homopolymer, or a polyethylene copolymer with 1-butene or other alpha-olefins; and, C) an elastomeric component, also called a biopolymer, consisting of a copolymer of propylene, ethylene, and optionally 1-butene. In yet more embodiments, the rTPO is prepared using a multi-stage gas phase polymerization process.

In some embodiments of the polymer composition, the propylene-based rTPO can have (A) 10-70 parts by weight of a homopolymer of propylene with isotactic index greater than 80, or a copolymer of propylene with ethylene, a $CH_2=CH_R$ alpha-olefin where R is a 2-8 carbon alkyl radical or combinations thereof, wherein the copolymer contains over 85% by weight of propylene and having an isotactic index greater than 80; (B) 5-20 parts by weight of a copolymer fraction of ethylene and propylene or another $CH_2=CH_R$ alpha-olefin, where R is a 2-8 carbon alkyl radical, or combinations thereof, containing greater than about 51% by weight ethylene, insoluble in xylene at ambient temperature; and, (C) 40-80 parts by weight of a copolymer fraction of ethylene and propylene or another $CH_2=CH_R$ alpha-olefin, where R is a 2-8 carbon alkyl radical, or combinations thereof, and optionally, minor portions of a diene, the fraction containing from 20 to less than 40% by weight of ethylene, being soluble in xylene at ambient temperature, and having an intrinsic viscosity of the xylene soluble fraction from 1.5 to 4 dl/g; wherein the percent by weight of the sum of the (B) and (C) fractions with respect to the total rTPO composition being from 30% to 90% and the (B)/(C) weight ratio being lower than 0.4. The rTPO can have a flexural modulus of less than 150 MPa, a tensile stress at break of from 8 to 20 Mpa, an elongation at break of higher than 400%, a tension set at 75% of from 20% to 50% and a haze of less than 40%.

Alternatively, the propylene-based rTPO can have (A) 20-40 parts by weight of a random copolymer of propylene with ethylene, a $CH_2=CH_R$ alpha-olefin where R is a 2-8 carbon alkyl radical or combinations thereof, wherein the copolymer contains over 85% by weight of propylene and having an isotactic index greater than 80; (B) 5-10 parts by weight of a copolymer fraction of ethylene and propylene or another $CH_2=CH_R$ alpha-olefin, where R is a 2-8 carbon alkyl radical, or combinations thereof, containing greater than about 35% by weight ethylene, insoluble in xylene at ambient temperature; and, (C) 55-75 parts by weight of a copolymer fraction of ethylene and propylene or another $CH_2=CH_R$ alpha-olefin, where R is a 2-8 carbon alkyl radical, or combinations thereof, and optionally, minor portions of a diene, the fraction containing from 20 to less than 40% by weight of ethylene, being soluble in xylene at ambient temperature, and having an intrinsic viscosity of the xylene soluble fraction from 1.5 to 4 dl/g; wherein the percent by weight of the sum of the (B) and (C) fractions with respect to the total rTPO composition being from 50% to 90% and the (B)/(C) weight ratio being lower than 0.4.

In other embodiments, the propylene-based rTPO can have (A) 30-60 parts by weight of a homopolymer of propylene with isotactic index greater than 80, or a copolymer of propylene with ethylene, a $CH_2=CH_R$ alpha-olefin where R is a 2-8 carbon alkyl radical or combinations thereof, wherein the copolymer contains over 85% by weight of propylene and having an isotactic index greater than 80; (B) 5-10 parts by weight of a copolymer fraction of ethylene and propylene or another $CH_2=CH_R$ alpha-olefin, where R is a 2-8 carbon alkyl radical, or combinations thereof, containing greater than about 35% by weight ethylene, insoluble in xylene at ambient temperature; and, (C) 55-75 parts by weight of a copolymer fraction of ethylene and propylene or another $CH_2=CH_R$ alpha-olefin, where R is a 2-8 carbon alkyl radical, or combinations thereof, and optionally, minor portions of a diene, the fraction containing from 20 to less than 40% by weight of ethylene, being soluble in xylene at ambient temperature, and having an intrinsic viscosity of the xylene soluble fraction from 1.5 to 4 dl/g; wherein the percent by weight of the sum of the (B) and (C) fractions with respect to the total rTPO composition being from 40% to 70%; and wherein the percent by weight of the sum of the ethylene in (B) and (C) fractions with respect to the total rTPO composition being from 20% to 50%.

In other embodiments, the propylene-based rTPO can have: (A) from 8 to 25% by weight of a crystalline polymer fraction selected from the group consisting of: (i) a propylene homopolymer, having solubility in xylene at ambient temperature lower than 10% by weight; and (ii) a copolymer of propylene and at least one alpha-olefin of formula $CH_2=CH_R$, where R is H or a 2-6 carbon linear or branched alkyl, containing at least 85% by weight of propylene, having solubility in xylene at ambient temperature lower than 15% by weight; and (B) from 75 to 92% by weight of an elastomeric fraction comprising: (1) a first elastomeric copolymer of propylene with at least one alpha-olefin of formula $CH_2=CH_R$, where R is H or a 2-6 carbon linear or branched alkyl, optionally containing 0.5 to 5% by weight of a diene, wherein the first elastomeric copolymer contains from 15 to 32% by weight alpha-olefin, and has a solubility in xylene at ambient temperature of greater than 50% by weight, the intrinsic viscosity of the xylene soluble fraction ranging from 3.0 to 5.0 dl/g; and (2) a second elastomeric copolymer of propylene with at least one alpha-olefin of formula $CH_2=CH_R$, where R is H or a 2-6 carbon linear or branched alkyl, optionally containing 0.5 to 5% by weight of a diene, wherein the second elastomeric copolymer contains more than 32% up to 45% by weight alpha-olefin, and has a solubility in xylene at ambient temperature greater than 80% by weight, the intrinsic viscosity of the xylene soluble fraction ranging from 4.0 to 6.5 dl/g; wherein a (1)/(2) weight ratio ranges from 1:5 to 5:1, and the propylene-based rTPO has a flexural modulus lower than 60 MPa, a Shore A hardness lower than 90, and a tension set at 100% lower than 35%.

All of the rTPOs described above are exemplary and show the wide variation in the formulations that allows for the broad use of rTPO polyolefin resins in sheet membrane applications. In addition to the rTPO formulas above, the polyolefins for the current compositions can also include any of the formulas described in U.S. Pat. Nos. 5,286,564 and 7,592,393, each of which is incorporated herein in its entirety for all purposes. The polyolefins can also be prepared by any of the reactor processes described in US2009015678, U.S. Pat. Nos. 7,592,393, 8,008,400, EP1025169, EP0640648, EP0472946, EP1687372, WO2016207235, WO2016207236, and US2012184675 as well.

In yet more embodiments, the rTPO is prepared using a multi-stage gas phase polymerization process. In some embodiments, the multi-stage gas phase polymerization process creates an alloy of the bipolymer with the polymer matrix (e.g. semi-crystalline PP backbone) while in the reactors. This allows for the bipolymer to be evenly dispersed throughout the polymer matrix because both are produced simultaneously during the polymerization process. The even dispersion translates to a new combination of softness, flexibility, low hardness, thermal resistance, haptics, mechanical and impact properties for the resulting rTPOs. Examples of such commercially available rTPOs include the Hifax, Adflex, Hiflex, and Softell product lines from LyondellBasell (Houston, TX).

The composition further comprises at least one LLDPE that is suitable for extrusion (extrusion grade) and has good flexibility. In some embodiments, LLDPE for the present compositions are copolymers of ethylene with at least one alpha-olefin selected from the group consisting of 1-butene, 1-hexene, and 1-octene. Alternatively, the LLDPE is preferably about 5 wt. % to 15 wt. % of long chain alpha-olefin such as 1-butene, 1-hexene, and copolymers of 1-octene and ethylene.

In some embodiments, the LLDPE resin has a density in the range of 0.900 to 0.939 g/cm$^3$ and/or a melt index (190° C./2.16 kg) of about 0.5 to about 2.0 g/10 min.

Many suitable LLDPE for the presently disclosed compositions are commercially available from LyondellBasell (Petrothene GA501020, Petrothene GA601032, Petrothene GS906062), Dow Chemical (DFDA-7059NT 7, DFDA-7047 NT 7), Ineos (C6-LLDPE series), Westlake HIFOR line (LF2020DD, LF1020AD), Nova Novapol line (PF-0218, PF-0118), Formosa L420022, and Braskem SLH118.

The polymer compositions have at least one LLDPE present in an amount between greater than 0 wt. % and up to 30 wt. %, based on the total weight of the polymer composition. In some embodiments, the total amount of LLDPE is between about 2 wt. % and about 15 wt. %, based on the total weight of the polymer composition; alternatively, the total amount of LLDPE is between about 10 wt. % and about 25 wt. %, based on the total weight of the polymer composition; alternatively, the total amount of LLDPE is between about 20 wt. % and about 35 wt. %, based on the total weight of the polymer composition; alternatively, the total amount of LLDPE is between about 10 wt. % or about 20 wt. %, based on the total weight of the polymer composition; alternatively, the total amount of LLDPE is between about 10 wt. %, about 15 wt. %, or about 20 wt. %, based on the total weight of the polymer composition.

Additives. The novel polyolefin compositions further comprise one or more additives, which are collectively referred to herein as an additives package. The additives package can include, but are not limited to, pigments and colorants, processing aids, mold release aids, acid scavengers, antioxidants, heat stabilizers, flame retardants, ultra-violet light stabilizers (such as hindered amine light stabilizers and others), metal deactivators, slip and anti-blocking agents. By way of example, the additives package can include TiO$_2$ pigment such that the articles formed from the polyolefin compositions are white, whereas black or grey articles will have carbon black in the additives package.

The additives may be used in conventional amounts. In some embodiments, the amount of the additives package (total weight of all additives) is greater than 0 to less than 20 wt. % of the polyolefin composition, depending on the application of the resulting extruded or molded article; alternatively, the additives package is present in an amount that is greater than 0 to less than 10 wt. % of the polyolefin composition; alternatively, the additives package is between 5 and 15 wt. % of the polyolefin composition; alternatively, the additives package is between 9 to less than 20 wt. % of the polyolefin composition.

In some embodiments, the additives are added individually (or in combination) to the composition directly, optionally while the composition is being blended or extruded, such that the additives are distributed approximately evenly throughout the composition. This type of additive addition may be called a "salt and pepper addition." In other embodiments, the additives may be added using a masterbatch. A masterbatch pre-blends (or entrains) additives into a carrier that is blendable with the polymer composition. Here, the carrier may be a polyethylene-based material or polypropylene-based material or a TPO/rTPO. One or more masterbatches may be used to introduce the additives to the compositions. In some embodiments, multiple masterbatches may carry different additives. In embodiments using multiple masterbatches, the polymer carrier of each masterbatch may be the same or different.

In still further embodiments, some of the additives may be added via a masterbatch route and other additives may be added via a salt and pepper addition.

Optional fillers: The novel polyolefin compositions can optionally contain one or more fillers, which is collectively referred to herein as a filler package. When present, the filler package (total amount of fillers) is between greater than 0 and up to 80 wt. % of the polyolefin compositions, depending on the application of the resulting extruded or molded article. In some embodiments, the optional filler package is present in an amount of greater than 0 and 40 wt. % of the polyolefin composition; alternatively, the optional filler package is present in an amount between 20 and 60 wt. % of the polyolefin composition; alternatively, the optional filler package is present in an amount between 50 and up to 80 wt. % of the polyolefin composition.

As with the additives, the fillers may be added to the polyolefin compositions using masterbatches or added via other methods such as the salt and pepper addition.

The fillers may be particle or fiber fillers, or combinations thereof. Exemplary fillers include, but are not limited to, talc, calcium carbonate, mica, hollow glass microspheres, solid glass, polymeric fibers, glass fibers, carbon fibers, mineral fibers, and biofibers (wood, flax, wheat straw, coconut, kenaf, and hemp).

The present disclosure further includes embodiments for articles and methods of forming the articles from the presently described compositions using known methods of extrusion and molding.

II. Properties

In yet another aspect of the present disclosure, there are provided polyolefin compositions, or articles molded or extruded therefrom, that have the following properties:

A melt flow rate (ASTM D 1238L) between about 0.1 and 10 g/10 min.

A thermal expansion force (N), also called the growth force, of about 2 to about 3.4 N, as measured by methods described herein.

A mold shrinkage of about 0.5 to about 0.7%, as measured by ASTM D955. Alternatively, a mold shrinkage of about 0.7%, as measured by ASTM D955.

A tensile strength at maximum elongation of 40 mil sheet samples of about 2400 to about 3200 psi as measured by ASTM D638.

A tensile strength at break of an injection molded specimen of about 8 to about 10 MPa as measured by ISO 527.

A tear resistance of 40 mil sheet samples of about 60 to about 70 N as measured by ASTM D1004.

A tear resistance of an injection molded plaque specimen of about 65 to about 75 kN/m as measured by the internal method.

A puncture resistance of 40 mil sheet samples about 160 to about 190 N as measured by ASTM D4833.

A tensile modulus of about 22000 to about 26000 psi as measured by ASTM D638 in the Machine Direction (MD) and about 12000 to about 14000 psi as measured by ASTM D638 in the Transverse Direction (TD).

EXAMPLES

The following examples are included to demonstrate embodiments of the appended claims using the above-described compositions. These examples are intended to be illustrative only, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

The components for the compositions in the Examples are as follows.

rTPO: A commercially available rTPO from LyondellBasell was used in the examples. The rTPO is an extrusion grade polymer that is already used for roofing membranes.

LLDPE: Three different LLDPEs that are commercially available from LyondellBasell were used in the examples. The LLDPEs were selected from different grades with different physical properties and compositions, but each was suitable for extrusion and had good flexibility.

LLDPE 1 is a general use LLDPE grade with excellent puncture resistance, elongation and heat seal strength. LLDPE 2 is a high-performance grade that offers enhanced film strength, drawdown, toughness and heat seal strength. LLDPE 3 is a premium, specialty grade LLDPE that has a melt index of 0.6 g/10 min, which contribute to films having high impact strength and superior tear resistance.

Physical Properties: Each of the compositions were evaluated according to the methods disclosed above under "Test methods". After blending the components for each composition, specimens were prepared either by extrusion, injection molding, or compression molding, and a series of measurements were performed to evaluate the compositions' suitability for applications such as roofing membranes or automotive and residential flooring. The results are shown in FIGS. 1-4.

Example 1

The suitability of the presently described composition for applications such as roofing membranes or automotive and residential flooring was evaluated, in part, by determining their dimensional stability by measuring the force of thermal expansion. If a membrane or square of flooring formed from the presently disclosed polyolefin compositions expands or contracts significantly as the temperature changes, then the membrane or flooring could separate and/or buckle after installation.

The force of thermal expansion was evaluated for the compositions shown in Table 1. Although no additives or fillers were added to the compositions in the present example, their presence will not affect the conclusion that results from the evaluated properties.

TABLE 1

Compositions for Example 1

|  | LLDPE 1 (wt. %) | rTPO (wt. %) |
|---|---|---|
| Composition 1 | 20 | 80 |
| Comparative Comp. 1 | 100 |  |
| Comparative Comp. 2 |  | 100 |

Figure 1:
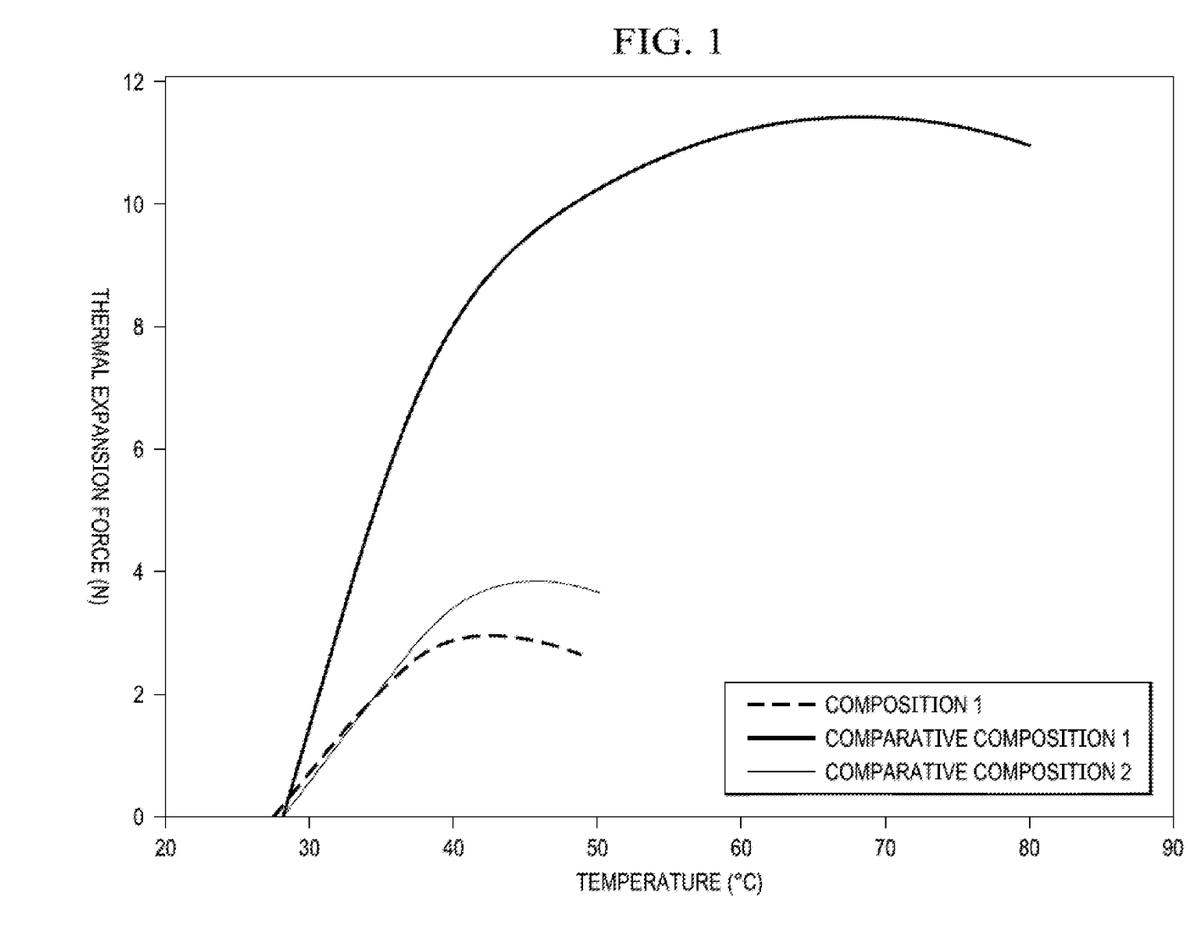
FIG. 1. Thermal expansion force for the compositions in Table 1.

The temperature range used in the thermal expansion force test method started at 27° C. for all compositions, but ended 5-10° C. after a maximum thermal expansion force was observed. The thermal expansion force results are shown in FIG. 1.

The largest thermal expansion force was observed for the 100% LLDPE 1 composition (Comparative Comp. 1), which had a maximum around 11.4 N. Membranes formed from this composition would experience significant separation and buckling. In contrast, the 100% rTPO composition (Comparative Comp. 2) had a much lower thermal expansion force over its tested temperature range, with a maximum around 3.8 N.

Unexpectedly, the addition of 20 wt. % LLDPE 1 to the rTPO in composition 1 further lowered the thermal expansion force. This was surprising as the addition of a LLDPE was expected to result in a maximum thermal expansion force that was between the 3.8 N observed with Comparative Comp. 2 and the 11.4 N observed with Comparative Comp. 1. Instead, maximum thermal expansion force of Composition 1 was much lower at about 2.9 N.

The reduction in thermal expansion force means that Composition 1 has an improved dimensional stability for sheet membrane and flooring applications, compared Comparative Comp. 2, which is already used for roofing membranes.

Additionally, the temperature of the maximum thermal expansion force for Composition 1 was lower than that for 100% rTPO.

Other properties such as tear strength and puncture resistance were about the same for Composition 1 and Comparative Comp. 2, as shown in Table 2 below.

Example 2

Figure 2:
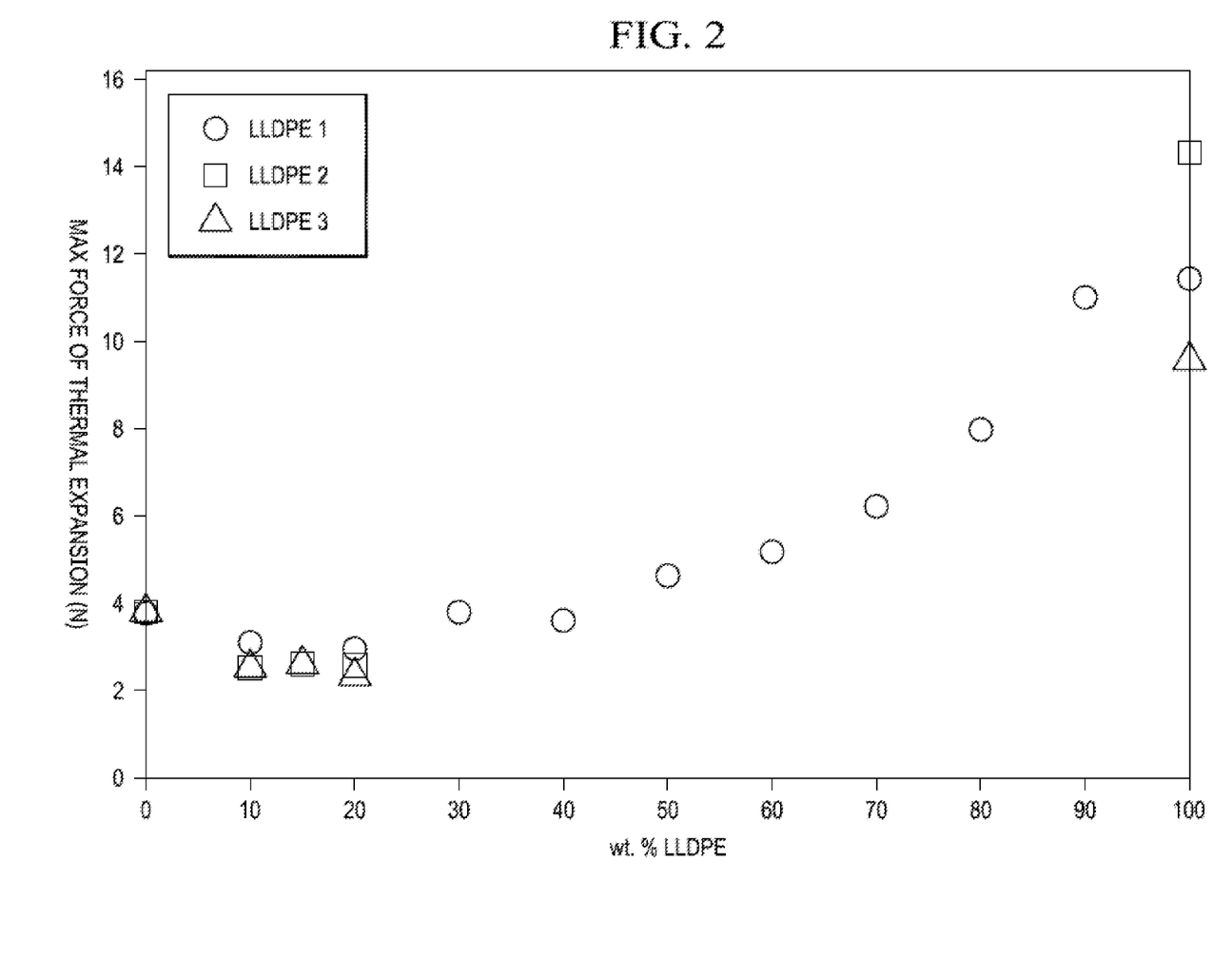
FIG. 2. Comparison of maximum thermal expansion force for a rTPO combined with varying amounts of three different LLDPEs.

A series of compositions were prepared with 10 to 90 wt. % of one of LLDPE 1, 2, or 3 with the rTPO to evaluate the effect of different grades of LLDPE on dimensional stability. The maximum thermal expansion force for each composition is shown in FIG. 2.

While the LLDPE grades by themselves offer different properties, the results showed that there were no major differences between the grades when blended with the rTPO. When the amount of LLDPE was between 10-30%, an unexpected drop in thermal expansion force (i.e. better dimensional stability) is observed for the three LLDPEs used.

Figure 3:
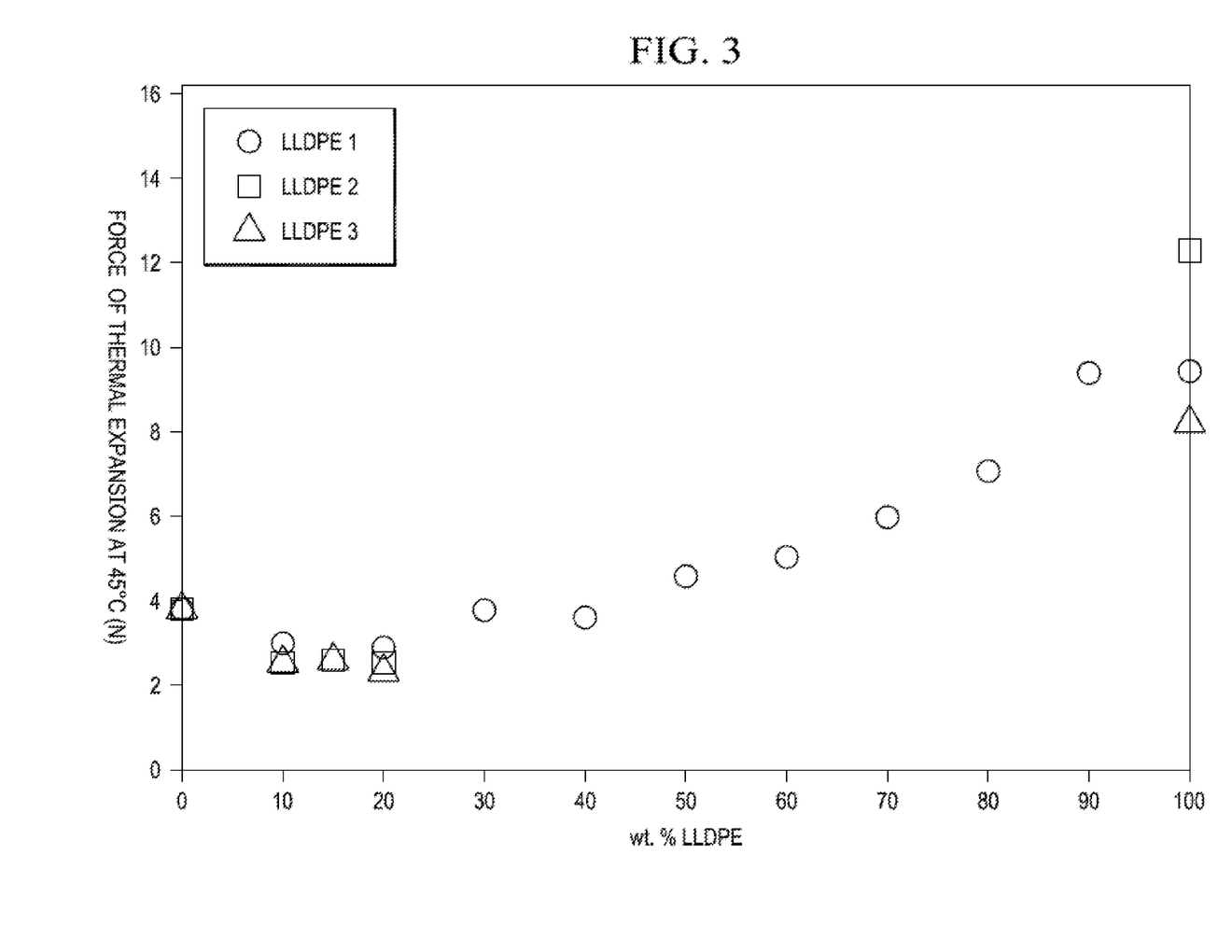
FIG. 3. Comparison of thermal expansion force at 45° C. for a rTPO combined with varying amounts of three different LLDPEs.

FIG. 3 displays the thermal expansion force for the compositions at 45° C. This temperature, 45° C., is particularly crucial for roofing applications because installed roofing membranes can reach 45° C. if they are in warm climates in the sun. Poor dimensional stability at this temperature would cause significant performance problems for the roof. The behavior observed in FIG. 2 for the compositions were consistent with FIG. 3—improved dimensional stability was seen when the amount of LLDPE was between 10-30%, regardless of grade.

Figure 4:
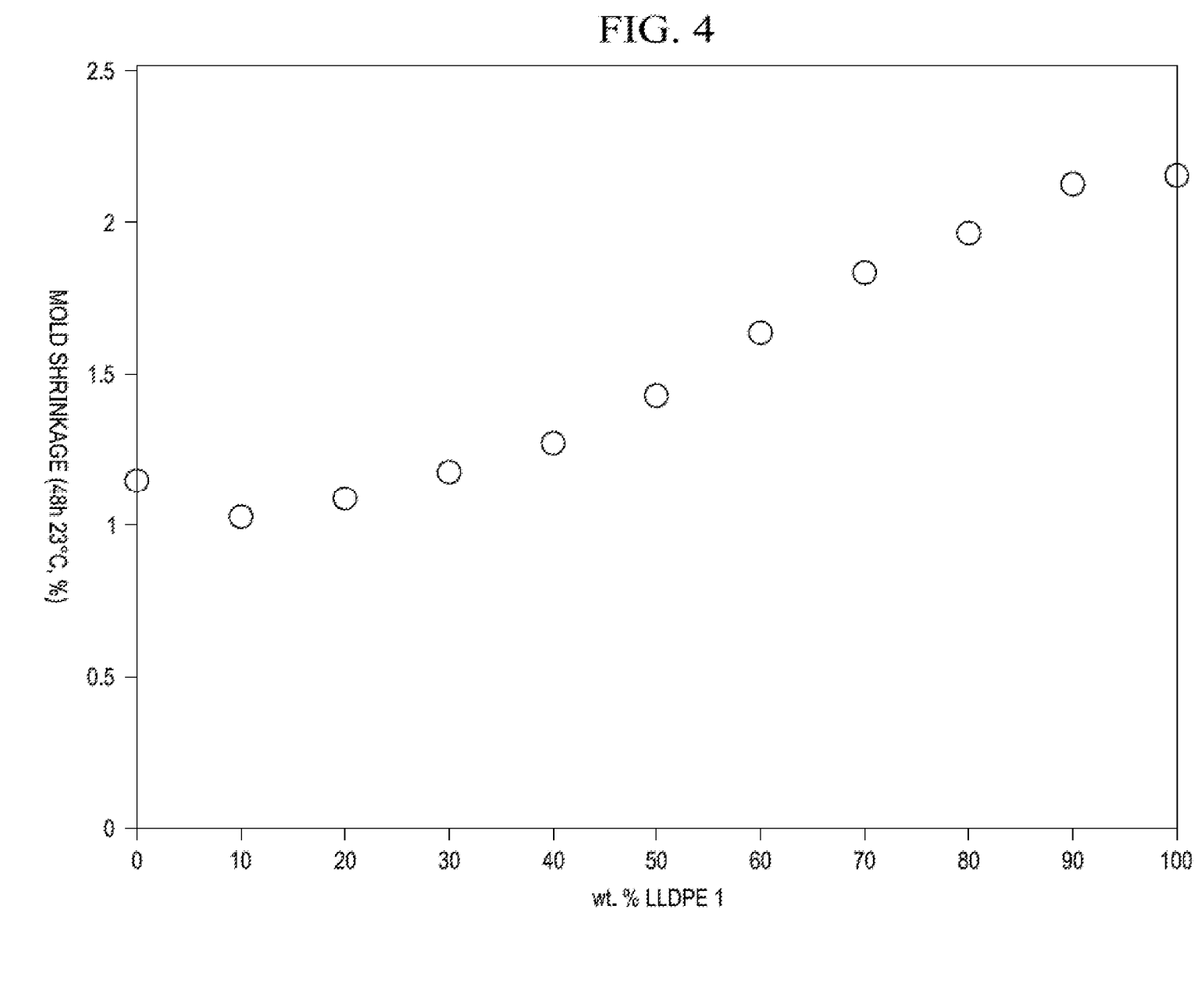
FIG. 4. Mold shrinkage of a rTPO with various amounts of LLDPE 1.

Another method of measuring the dimensional stability is mold shrinkage. FIG. 4 shows the mold shrinkage for the rTPO with various amounts of LLDPE 1. As with the thermal expansion force, a reduction in mold shrinkage was observed when up to 30% of the composition was LLDPE.

Thus, the compositions comprising up to 30 wt. % of LLDPE had almost the same, if not better dimensional stability than 100% rTPO. This would allow the compositions to be used as sheet membranes. Further, they would be useful for sheet membranes applications that do not have much room from thermal expansion after installation.

While the dimensional stability improved, the remaining properties were about the same or slightly better with this range of LLDPE. A benefit of rTPOs is their mechanical toughness, flexibility, barrier properties, and environmental resistance. Table 2 displays these properties for a select number of compositions LLDPEs as measured on 1 mm thick sheet.

sheet membrane applications where expansion or shrinkage is a concern. As an example, these polyolefin compositions would be suitable for the formation of roofing membranes as they would have little expansion under temperatures experienced on roofs during the warmer months. By retaining many of the rTPO's properties, such as high flexibility and tear/puncture resistance, the polyolefin compositions can be used in many applications such as flooring membranes, geomembranes, and automotive skins.

The following references are incorporated by reference in their entirety.
ASTM Standard D1238, "Test Method for Melt Flow Rates of Thermoplastics by Extrusion Plastometer".
ASTM D792-19, "Standard Test Methods for Density and Specific Gravity (Relative Density) of Plastics by Displacement".
ASTM D955-08, "Standard Test Method of Measuring Shrinkage from Mold Dimensions of Thermoplastics".
ASTM D638-03, "Standard Test Method for Tensile Properties of Plastics".
ASTM D2240, "Standard Test Method for Rubber Property—Durometer Hardness".
ASTM D1004, "Standard Test Method for Tear Resistance (Graves Tear) of Plastic Film and Sheeting".
ASTM D624, "Standard Test Method for Tear Strength of Conventional Vulcanized Rubber and Thermoplastic Elastomers".

TABLE 2

Physical properties for compositions having 10, 15, and 20 wt. % of LLDPE.

| | 40 mil Sheet Samples | | | | | | | Injection Molded Samples | |
|---|---|---|---|---|---|---|---|---|---|
| | Tensile Stress at Max Extension MD (psi) | Tensile Stress at Max Extension TD (psi) | Tensile Modulus 1% Secant MD (psi) | Tensile Modulus 1% Secant TD (psi) | Puncture Resistance (N) | Tear Resistance MD (N) | Tear Resistance TD (N) | Tensile Stress at Break (MPa) | Tear Strength (kN/m) |
| 100 wt. % rTPO** | 2940 | 2700 | 23330 | 13330 | 170 | 62.41 | 57.63 | 9.18 | 68.6 |
| 10 wt. % LLDPE 1 | 3120 | 2500 | 22770 | 13130 | 182.7 | 63.63 | 61.6 | 9.45 | 70.5 |
| 15 wt. % LLDPE 1 | 3220 | 2400 | 23890 | 12980 | 181.5 | 62.16 | 62.59 | 8.88 | 72.5 |
| 20 wt. % LLDPE 1* | 3310 | 2530 | 23970 | 12970 | 189.6 | 65.65 | 64.3 | 9.82 | 73.3 |
| 10 wt. % LLDPE 2 | 3040 | 2430 | 22940 | | 167.9 | 64.98 | 61.68 | 8.58 | 69.2 |
| 15 wt. % LLDPE 2 | 3070 | 2540 | 24970 | | 168.7 | | 62.37 | 8.44 | 69.9 |
| 20 wt. % LLDPE 2 | 3170 | 2480 | 25320 | | 176.7 | | 65.84 | 8.78 | 70.6 |
| 10 wt. % LLDPE 3 | 3110 | 2480 | 22120 | | 177.8 | | 61.73 | 8.20 | 68.0 |
| 15 wt. % LLDPE 3 | 3250 | 2530 | 23950 | | 176.3 | | 64.19 | 8.53 | 69.1 |
| 20 wt. % LLDPE 3 | 3208 | 2620 | 23870 | | 174 | | 66.08 | 8.63 | 70.1 |

TD = Transverse Direction
MD = Machine Direction
*Composition 1
**Comparative Composition 2

For many of the compositions, the addition of the LLDPE improved the tear or puncture resistance or the tensile modulus. However, many of the compositions had about the same properties as the 100% rTPO. Thus, this shows that the LLDPE did not negatively affect the more useful properties for the rTPO.

The exemplary polyolefin compositions displayed a small thermal expansion force, allowing for a broad number of ASTM D4833, "Standard Test Method for Index Puncture Resistance of Geomembranes and Related Products".
ISO 1628-1, "Plastics—Determination of the viscosity of polymers in dilute solution using capillary viscometers".
ISO 527-1 2019, "Plastics—Determination of tensile properties".
US2009015678
US2012184675

U.S. Pat. No. 5,286,564
U.S. Pat. No. 7,592,393
U.S. Pat. No. 8,008,400
EP0472946
EP0640648
EP1025169
EP1687372
WO2016207235
WO2016207236

What is claimed is:

1. A polyolefin composition comprising:
a) a polymer composition comprising:
  i) a linear low-density polyethylene (LLDPE) comprising copolymers of ethylene with at least one alpha-olefin selected from the group consisting of 1-butene, 1-hexene, and 1-octene, wherein said LLDPE is present in an amount between greater than 0 and about 30 wt. %, based on the total weight of the polymer composition,
  ii) a reactor-made thermoplastic polymer (rTPO) present in an amount between about 70 wt. % to less than 100 wt. %, based on the total weight of the polymer composition, said rTPO comprising fractions:
    (A) 10-70 parts by weight of a homopolymer of propylene with isotactic index greater than 80, or a copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80;
    (B) 5-20 parts by weight of a copolymer fraction of ethylene and propylene or another $CH_2=CHR$ alpha-olefin, where R is a 2-8 carbon alkyl radical, or combinations thereof, greater than about 35% by weight ethylene, insoluble in xylene at ambient temperature;
    (C) 40-80 parts by weight of a copolymer fraction of ethylene and propylene or another $CH_2=CHR$ alpha-olefin, where R is a 2-8 carbon alkyl radical, or combinations thereof, and optionally, minor portions of a diene, said fraction containing from 20 to less than 60% by weight of ethylene, being soluble in xylene at ambient temperature, and having an intrinsic viscosity of the xylene soluble fraction from 1.5 to 4 dl/g;
    wherein the percent by weight of the sum of the (B) and (C) fractions with respect to the total reactor-made thermoplastic polymer being from 30% to 90% and a weight ratio of (B)/(C) is lower than 0.4;
b) an additives package comprising one or more additives, wherein the additives package is present in an amount of 5 wt. % to less than 20 wt. %; and,
c) a fillers package having two or more different fillers, wherein the fillers package is present in an amount of at least 20 wt. % and up to 80 wt. %,
wherein said polyolefin composition has a melt flow rate (ASTM D 1238L) between about 0.1 and 10 g/10 min, a tensile strength at break of 8 to less than 10 MPa (measured according to ISO 527), and a tensile strength at maximum elongation, measured a sheet sample of 40 mil, of 2,400 to 3,200 psi.

2. The polyolefin composition of claim 1, wherein said reactor-made thermoplastic polymer comprises fractions:
  (A) 20-40 parts by weight of a random copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80;
  (B) 5-10 parts by weight of a copolymer fraction of ethylene and propylene or another $CH_2=CHR$ alpha-olefin, where R is a 2-8 carbon alkyl radical, or combinations thereof, containing greater than about 35% by weight ethylene, insoluble in xylene at ambient temperature;
  (C) 55-75 parts by weight of a copolymer fraction of ethylene and propylene or another $CH_2=CHR$ alpha-olefin, where R is a 2-8 carbon alkyl radical, or combinations thereof, and optionally, minor portions of a diene, said fraction containing from 20 to less than 40% by weight of ethylene, being soluble in xylene at ambient temperature, and having an intrinsic viscosity of the xylene soluble fraction from 1.5 to 4 dl/g,
  wherein the percent by weight of the sum of the (B) and (C) fractions with respect to the total reactor-made thermoplastic polymer being from 50% to 90% and the weight ratio of (B)/(C) is lower than 0.4, and said reactor-made thermoplastic polymer having a flexural modulus of less than 150 MPa, a tensile stress at break from 8 to 9.75 MPa (measured according to ISO 527), an elongation at break of higher than 400%, a tension set at 75% of from 20% to 50% and a haze of less than 40%.

3. The polyolefin composition of claim 1, wherein said reactor-made thermoplastic polymer comprises fractions:
  (A) 30-60 parts by weight of a homopolymer of propylene with isotactic index greater than 80, or a copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80;
  (B) 5-10 parts by weight of a copolymer fraction of ethylene and propylene or another $CH_2=CHR$ alpha-olefin, where R is a 2-8 carbon alkyl radical, or combinations thereof, containing greater than about 35% by weight ethylene, insoluble in xylene at ambient temperature;
  (C) 55-75 parts by weight of a copolymer fraction of ethylene and propylene or another $CH_2=CHR$ alpha-olefin, where R is a 2-8 carbon alkyl radical, or combinations thereof, and optionally, minor portions of a diene, said fraction containing from 20 to less than 40% by weight of ethylene, being soluble in xylene at ambient temperature, and having an intrinsic viscosity of the xylene soluble fraction from 1.5 to 4 dl/g,
  wherein the percent by weight of the sum of the (B) and (C) fractions with respect to the total reactor-made thermoplastic polymer being from 40% to 70% and wherein the percent by weight of the sum of the ethylene in (B) and (C) fractions with respect to the total reactor-made thermoplastic polymer being from 20% to 50%.

4. The polyolefin composition of claim 1, wherein said reactor-made thermoplastic polymer comprises fractions:
  (A) 10-70 parts by weight of a homopolymer of propylene with isotactic index greater than 80, or a copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80;

(B) 5-20 parts by weight of a copolymer fraction of ethylene and propylene or another $CH_2=CHR$ alpha-olefin, where R is a 2-8 carbon alkyl radical, or combinations thereof, greater than about 51% by weight ethylene, insoluble in xylene at ambient temperature;

(C) 40-80 parts by weight of a copolymer fraction of ethylene and propylene or another $CH_2=CHR$ alpha-olefin, where R is a 2-8 carbon alkyl radical, or combinations thereof, and optionally, minor portions of a diene, said fraction containing from 20 to less than 60% by weight of ethylene, being soluble in xylene at ambient temperature, and having an intrinsic viscosity of the xylene soluble fraction from 1.5 to 4 dl/g;

wherein the percent by weight of the sum of the (B) and (C) fractions with respect to the total reactor-made thermoplastic polymer being from 30% to 90% and the weight ratio of (B)/(C) is lower than 0.4.

5. The polyolefin composition of claim 1, where said LLDPE is an extrusion grade.

6. The polyolefin composition of claim 1, where said LLDPE is present in an amount between about 5 and about 25 wt. %, based on the total weight of the polymer composition.

7. An article made from the polyolefin composition of claim 1.

8. The article of claim 7, having a mold shrinkage of about 0.5 to about 0.7% (measured per ASTM D955) and a thermal expansion force between 2 and 3.4 N.

9. An article made from the polyolefin composition of claim 1, wherein the article is a sheet membrane.

10. A sheet membrane comprising:
a) a polymer composition comprising:
  i) a linear low-density polyethylene (LLDPE) comprising copolymers of ethylene with at least one alpha-olefin selected from the group consisting of 1-butene, 1-hexene, and 1-octene, wherein said LLDPE is present in an amount between greater than 0 and about 30 wt. %, based on the total weight of the polymer composition,
  ii) a reactor-made thermoplastic polymer (rTPO) present in an amount between about 70 wt. % to less than 100 wt. %, based on the total weight of the polymer composition, said rTPO comprising fractions:
    (A) 10-70 parts by weight of a homopolymer of propylene with isotactic index greater than 80, or a copolymer of propylene with ethylene, a $CH_2=CHR$ alpha-olefin where R is a 2-8 carbon alkyl radical or combinations thereof, which copolymer contains over 85% by weight of propylene and having an isotactic index greater than 80;
    (B) 5-20 parts by weight of a copolymer fraction of ethylene and propylene or another $CH_2=CHR$ alpha-olefin, where R is a 2-8 carbon alkyl radical, or combinations thereof, containing greater than about 35% by weight ethylene, insoluble in xylene at ambient temperature;
    (C) 40-80 parts by weight of a copolymer fraction of ethylene and propylene or another $CH_2=CHR$ alpha-olefin, where R is a 2-8 carbon alkyl radical, or combinations thereof, and optionally, minor portions of a diene, said fraction containing from 20 to less than 60% by weight of ethylene, being soluble in xylene at ambient temperature, and having an intrinsic viscosity of the xylene soluble fraction from 1.5 to 4 dl/g;
    wherein the percent by weight of the sum of the (B) and (C) fractions with respect to the total reactor-made thermoplastic polymer being from 30% to 90% and the (B)/(C) weight ratio being lower than 0.4;
b) an additives package comprising one or more additives, wherein the additives package is present in an amount of 5 wt. % and less than 20 wt. %; and,
c) a fillers package comprising two or more fillers, wherein the fillers package is present in an amount of at least 20 wt. % and up to 80 wt. %;
wherein said sheet membrane has a tensile strength at maximum elongation, measured a sheet sample of 40 mil, of 2,400 to 3,200 psi, a tensile strength at break from 8 to less than 10 MPa (measured according to ISO 527), a mold shrinkage of about 0.5 to about 0.7% as measured per ASTM D955 and a max force of thermal expansion between 2 and 3.4 N.

11. The sheet membrane of claim 10, wherein the mold shrinkage of the sheet membrane is about 0.7%.

12. The sheet membrane of claim 10, wherein the maximum thermal expansion force for the sheet membrane is about 2 N.

13. The sheet membrane of claim 10, wherein the sheet membrane is a roofing membrane or flooring membrane.

14. The sheet membrane of claim 10, wherein the sheet membrane is a geomembrane.

15. The sheet membrane of claim 10, wherein the sheet membrane is an automotive skin.

\* \* \* \* \*